US012666248B2

(12) United States Patent
Mishra et al.

(10) Patent No.: US 12,666,248 B2
(45) Date of Patent: Jun. 23, 2026

(54) MANAGING ALTERNATE-NETWORK SLICE IN MULTI-SIM UE

(71) Applicant: Samsung Electronics Co., Ltd., Suwon-si (KR)

(72) Inventors: Vijay Kumar Mishra, Bangalore (IN); Govind Irappa Uttur, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 376 days.

(21) Appl. No.: 18/452,293

(22) Filed: Aug. 18, 2023

(65) Prior Publication Data

US 2024/0048956 A1     Feb. 8, 2024

Related U.S. Application Data

(63) Continuation of application No. PCT/KR2023/011172, filed on Jul. 31, 2023.

(30) Foreign Application Priority Data

Aug. 3, 2022 (IN) ............................ 202241044452
Jul. 14, 2023 (IN) ............................ 202241044452

(51) Int. Cl.
*H04W 8/18* (2009.01)
*H04W 60/00* (2009.01)

(52) U.S. Cl.
CPC ........... *H04W 8/18* (2013.01); *H04W 60/002* (2025.08)

(58) Field of Classification Search
CPC ..... H04W 8/18; H04W 60/002; H04W 8/183; H04W 60/005; H04W 60/04; H04W 48/18; H04W 88/06
See application file for complete search history.

(56) References Cited

U.S. PATENT DOCUMENTS 10,979,955 B2     4/2021     Vrzic
11,375,470 B2     6/2022     Zhu et al.
(Continued)

FOREIGN PATENT DOCUMENTS

CN          110710237          1/2020
CN          112492694 A        3/2021
(Continued)

OTHER PUBLICATIONS

Search Report and Written Opinion dated Nov. 15, 2023 issued in International Patent Application No. PCT/ KR2023/011172.
(Continued)

*Primary Examiner* — Wayne H Cai
(74) *Attorney, Agent, or Firm* — NIXON & VANDERHYE P.C.

(57)                    ABSTRACT

Embodiments herein provide a method for management of alternate-network slice in a multi-SIM UE. The method includes storing slice mapping information in a network slice database. The slice mapping information includes a mapping among each candidate network slice of a plurality of network slices associated with a plurality of SIMs of the MUSIM UE. The method includes determining whether candidate network slice associated with a first SIM of the plurality of SIMs is available. The method includes determining candidate network slice associated with a second SIM based on the stored slice mapping information in the network slice database when the candidate network slice associated with the first SIM is not available. The method includes sending a registration request message to a second network operator associated with the second SIM based on the determined candidate network slice associated with the second SIM.

18 Claims, 5 Drawing Sheets

(56) References Cited

U.S. PATENT DOCUMENTS

| | | | | |
|---|---|---|---|---|
| 2022/0191824 A1* | 6/2022 | Kumar | .................. | H04W 68/02 |
| 2022/0322071 A1 | 10/2022 | Hong | | |
| 2023/0308855 A1* | 9/2023 | Matolia | ................. | H04W 8/183 |
| 2024/0023005 A1 | 1/2024 | Wang | | |

FOREIGN PATENT DOCUMENTS

| | | | |
|---|---|---|---|
| CN | 113301586 | | 8/2021 |
| CN | 114071576 | | 2/2022 |
| CN | 114501545 | | 5/2022 |
| KR | 10-2022-0053309 | | 4/2022 |
| KR | 10-2524170 | | 4/2023 |
| WO | 2021/069085 | | 4/2021 |
| WO | 2021/258287 | A1 | 12/2021 |
| WO | 2022/099679 | | 5/2022 |
| WO | 2022/116797 | | 6/2022 |

OTHER PUBLICATIONS

3GPP TS 29.531, "Technical Specification Group Core Network and Terminals", Stage 3, (Release 17), Jun. 2022, 82 pages.
3GPP TSG-SA2, "Function Description for Multi-SIM devices", Meeting Notes, Meeting #145E, May 16-28, 2021, 8 pages.
3GPP TSG-CT WG1, "NSSAI mapping during transfer of PDU session from HPLMN to VPLMN & VPLMN to HPLMN", Meeting Notes, Meeting #136-e, May 12-20, 2022, 39 pages.
3GPP SA WG2 Meeting #150E, S2-2202221,, Key issue for Handling Rejected S-NSSAIs in some TAs of RA, Apr. 6-12, 2022, 2 pages, Ericsson, Nokia, Nokia shanghai Bell, Samsung, InterDigital Inc.
3GPP SA WG2 Meeting #150E, S2-2203080, Key issue for Handling Rejected S-NSSAIs in some TAs of RA, Apr. 6-12, 2022, 2 pages, Ericsson, Nokia, Nokia shanghai Bell, Samsung, InterDigital Inc.
3GPP TS 38.331 V17.5.0, 3rd Generation Partnership Project; Technical Specification Group Radio Access Network;, Jun. 2023, 1328 pages, NR; Radio Resource Control (RRC) protocol specification.
3GPP TSG-WG SA2 Meeting #150E e-meeting, S2-2202757, A New Solution for KI#1: Support of Network Slice Service Continuity, Apr. 6-12, 2022, 4 pages, Samsung.
3GPP TSG-WG SA2 Meeting #150E e-meeting, S2-2203083, A New Solution for KI#1: Support of Network Slice Service Continuity, Apr. 6-12, 2022, 5 pages, Samsung.
Khan et al., Highly Accurate and Reliable Wireless Network Slicing in 5th Generation Networks: A Hybrid Deep Learning Approach, Department of Computer Science, Information Sciences, Technology, Instituto De Telecomunicaces, Date Unknown, 17 pages.
Online, https://www.youtube.com/watch?v=STn2ZJbf00k.
SA WG2 Meeting #150E (e-meeting), S2-2202737, New key issue: KI for objective #4—Improved Network control of the UE behaviour, Apr. 6-12, 2022, 2 pages, Nokia, Nokia Shanghai Bell, Ericsson, Samsung, Verizon UK Ltd.
SA WG2 Meeting #150E (e-meeting), S2-2202854, KI#1 new Solution Z: PDU session handover to a target CN with an alternative S-NSSAI support, Apr. 6-12, 2022, 3 pages, NEC.
SA WG2 Meeting #150E (e-meeting), S2-2203081, New key issue: KI for objective #4—Improved Network control of the UE behaviour, Apr. 6-12, 2022, 2 pages, Nokia, Nokia Shanghai Bell, Ericsson, Samsung, Verizon UK Ltd.
SA WG2 Meeting #150E (e-meeting), S2-2203086, KI#1 new Solution Z: PDU session handover to a target CN with an alternative S-NSSAI support, Apr. 6-12, 2022, 3 pages, NEC.
SA WG2 Meeting #150e, S2-2203088, New Solution to KI#2: Enabling awareness of Network Slice availability in VPLMNs, Apr. 6-12, 2022, 4 pages, InterDigital Inc.
Extended European Search Report dated Mar. 31, 2025 issued in European Patent Application No. 23850379.1.
Office Action for IN Application No. 202241044452 dated Jan. 19, 2026, 7 pages.

* cited by examiner

200

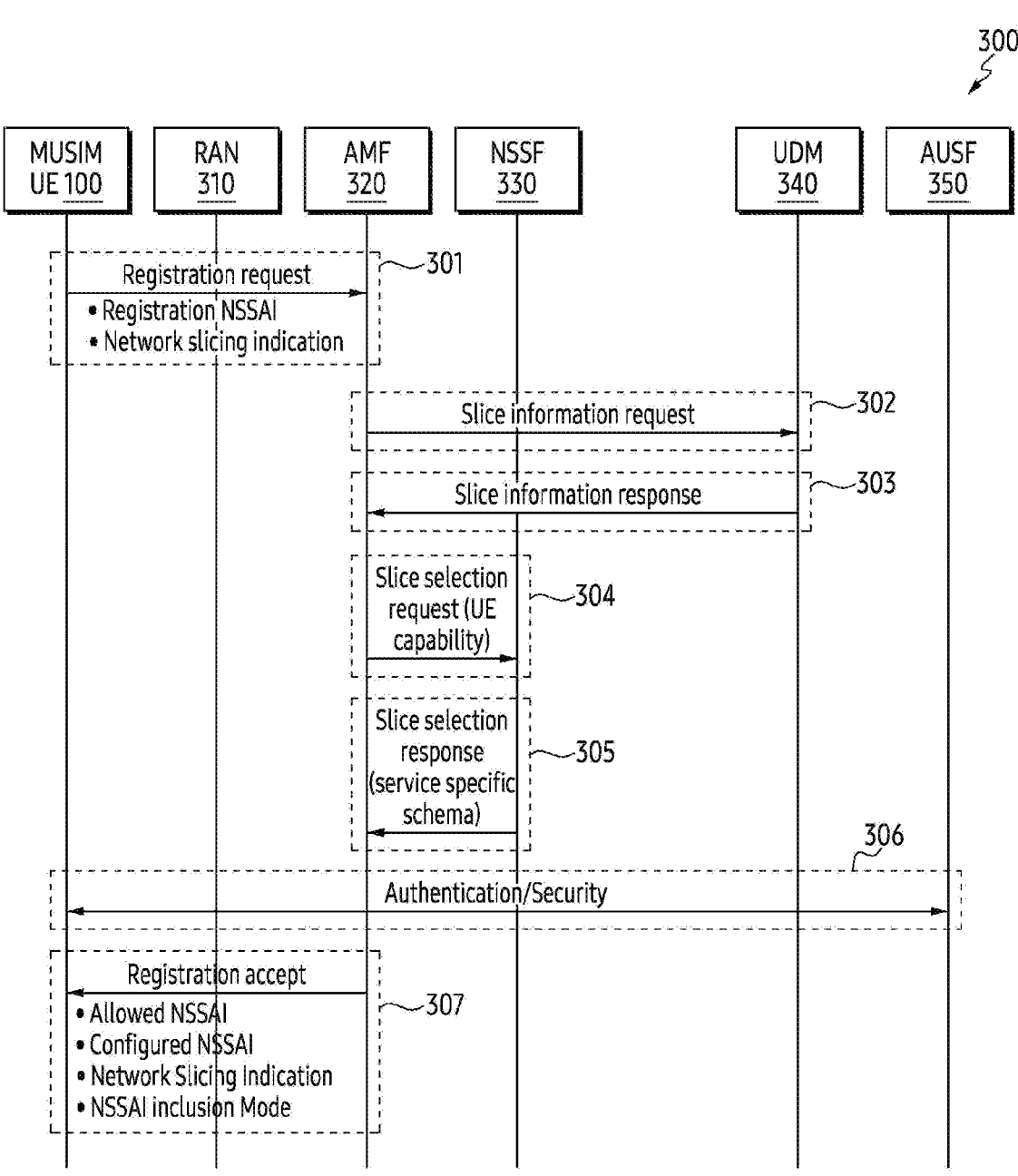

300

| MUSIM UE 100 | RAN 310 | AMF 320 | NSSF 330 | UDM 340 | AUSF 350 |

Registration request — 301
• Registration NSSAI
• Network slicing indication

Slice information request — 302

Slice information response — 303

Slice selection request (UE capability) — 304

Slice selection response (service specific schema) — 305

Authentication/Security — 306

Registration accept — 307
• Allowed NSSAI
• Configured NSSAI
• Network Slicing Indication
• NSSAI inclusion Mode

FIG. 3

MANAGING ALTERNATE-NETWORK SLICE IN MULTI-SIM UE

CROSS-REFERENCE TO RELATED APPLICATIONS

This application is a continuation of International Application No. PCT/KR2023/011172 designating the United States, filed on Jul. 31, 2023, in the Korean Intellectual Property Receiving Office and claiming priority to Indian Provisional Patent Application No. 202241044452, filed on Aug. 3, 2022, in the Indian Patent Office, and to Indian Complete Patent Application No. 202241044452, filed on Jul. 14, 2023, in the Indian Patent Office, the disclosures of each of which are incorporated by reference herein in their entireties.

BACKGROUND

Field

The disclosure relates to a wireless network. for example, the disclosure relates to management of alternate-network slice in Multi-Subscriber Identity Module (MUSIM) User Equipment (UE).

Description of Related Art

In general, network slicing is a concept where a single spectrum band is sliced to create multiple virtual networks, so that many application requirements run using the same network. Through network slicing multiple networks can exist on a common physical network. Network slicing is one of the most innovative technologies in $5^{th}$ Generation (5G) as the network slicing optimizes the single network for multiple use cases. For instance, network requirement for mobile broad band is different from an Internet of Things (IoT). Multiple use cases require different latency, security and configuration. In the network slicing, each slice contains its own unique latency, security and bandwidth characteristics. One network slice can be designed to offer low speed and low data while another network slice is designed to offer high throughput. Hence, the network slice preserves resources by understanding the context and use cases for each application and appropriately assigning the correct number of resources. The network slicing ensures the network is efficiently used and managed resulting in revenue maximisation for operators as they offer captive private network as a service to enterprises. Certain examples for use cases are mobile broadband, machine-to-machine communications (e.g., in manufacturing or logistics), or smart cars.

Currently, the network slices need dedicated resources and are limited in the network. When number of users cross the maximum limit, new users slice request is rejected by the network. When the requested slice is not available an alternate slice which is generally inferior to the requested slice is provided by the network. Providing the alternate slice by the network on the UE's slice request is also applicable for roaming and inter Random Access (RA)-Handovers. Therefore, an end user will be benefitted when the UE is able to pick the best option for the network slice so that UE's Key Performance Indicators (KPIs) like throughput speed, latency, and power consumption are not degraded when UEs opt for the alternate slice. When the UE is offered with the alternate slice which is inferior to the requested slice, the performance of the UE is reduced. The UE itself can identify the alternate/compatible slice and communicate the same to the network. In conventional methods there is no method for handling network slices in a MUSIM environment in order to not to allow for degrading of the KPIs of the UE. Hence there remains a need of how the UE manages the slice selection in MUSIM environment of the UE.

Thus, it is desired to address the above-mentioned disadvantages or other shortcomings or at least provide a useful alternative to address the inter-device connection setup problems and synchronization problems.

SUMMARY

Embodiments of the disclosure may provide a system and method for management of alternate-network slice in a multi-SIM UE. According to various embodiments, when a slice registration request is rejected by a first network operator, the MUSIM UE initiates slice registration request to a second network operator based on a slice mapping information for a plurality of network slices associated with a plurality of SIMs maintained by the MUSIM UE. According to various embodiments an example method is used to check the availability of required network slice in the second network operator slice rather than managing with inferior-alternate network slice on the first network operator.

Embodiments of the disclosure may provide a method for switching a data connection from the first SIM to a second SIM when the at least one alternate network slice is associated with the second SIM is available.

Embodiments of the disclosure may provide a method for prioritizing the slice mapping information based on critical network slice required by the MUSIM UE.

According to an example embodiment, a method for management of alternate-network slice in a multi-SIM UE is provided. The method includes storing slice mapping information in a network slice database. The slice mapping information includes a mapping among each candidate network slice of a plurality of network slices associated with a plurality of SIMs of the MUSIM UE. The method may include determining whether candidate network slice associated with a first SIM of the plurality of SIMs is available. The method includes determining candidate network slice associated with a second SIM based on the stored slice mapping information in the network slice database based on the candidate network slice associated with the first SIM not being available. The method includes sending a registration request message to a second network operator associated with the second SIM based on the determined candidate network slice associated with the second SIM.

In an example embodiment, the method includes determining the candidate network slice of the plurality of network slices associated with the plurality of SIMs based on the stored slice mapping information in the network slice database, based on the candidate network slice associated with the first SIM being unavailable.

In an example embodiment, the method includes determining the candidate network slice is associated with the first SIM or the second SIM of the plurality of SIMs is available. The method includes sending a registration request message to a first network operator associated with the first SIM and receiving a registration response message from the first network operator to determine whether the candidate network slice is associated with the first SIM is available. The registration response message includes any one of a registration accept message and a registration reject message; or switching a data connection from the first SIM to the second SIM based on the candidate network slice being associated with the second SIM is available, sending the registration request message to the second network operator associated with the second SIM, and receiving a registration accept message from the second network operator.

In an example embodiment, the method includes sending the registration request message to the first network operator, wherein the registration request message comprises Single Network Slice Selection Assistance Information (S-NSSAI) about the at least one candidate network slice associated with the first SIM.

In an example embodiment, the method includes sending the registration request message to the second network operator. The registration request message includes S-NSSAI about the candidate network slice associated with the second SIM that is same as the S-NSSAI about the candidate network slice associated with the first SIM.

In an example embodiment, the method includes receiving information of the plurality of network slices supported by the first network operator associated with the first SIM and information of the plurality of network slices supported by the second network operator associated with the second SIM. The method includes determining the candidate network slice supported by the first network operator and the candidate network slice supported by the second network operator. The method includes creating the slice mapping information by mapping the determined candidate network slice associated with the first SIM to the candidate network slice associated with the second SIM and storing the created slice mapping information in the network slice database.

In an example embodiment, the method includes updating the candidate network slice associated with the first SIM is unavailable in the network slice database based on the candidate network slice associated with the first SIM being unavailable or upon receiving a registration reject message from the first network operator associated with the first SIM.

In an example embodiment, the method includes sending the registration request message to the first network operator associated with the first SIM. The method includes receiving the registration reject message from the first network operator and determining the candidate network slice is not available based on the received registration reject message.

In an example embodiment, the method includes checking slice mapping information stored in the network slice database to determine the candidate network slice associated with the second SIM of the plurality of SIMs based on the at least one candidate network slice associated with the first SIM not being available.

In an example embodiment, the method includes determining a critical candidate network slice based on the received information of the plurality of network slices supported by the first network operator associated with the first SIM and information of the plurality of network slices supported by the second network operator associated with the second SIM. The method includes prioritizing the critical candidate network slice in the network slice database based on the determined at least one critical candidate network slice. The method includes checking the network slice database whether the critical candidate network slice associated with the first SIM is available based on the prioritization. The method includes, sending the registration request message to the first network operator based on the critical candidate network slice associated with the first SIM being available or sending, by the MUSIM UE, the registration request message to the second network operator based on the at least one critical candidate network slice associated with the first SIM not being available.

In an example embodiment, the slice mapping information comprises a priority information associated with each candidate network slice of the plurality of network slices associated with the plurality of SIMs of the MUSIM UE.

According to an example embodiment, a MUSIM UE configured to manage an alternate-network slice a memory is provided. The MUSIM UE includes a processor coupled to the memory, and a network slice database storing slice mapping information in the network slice database. The slice mapping information includes the mapping among each candidate network slice of the plurality of network slices associated with the plurality of SIMs of the MUSIM UE. The MUSIM UE includes an alternate-network slice controller communicatively coupled to the memory, the processor and the network slice database. The alternate-network slice controller is configured to determine whether a candidate network slice associated with the first SIM of the plurality of SIMs is available. The alternate-network slice controller is configured to determine the candidate network slice associated with the second SIM based on the stored slice mapping information in the network slice database based on the candidate network slice associated with the first SIM not being available. The alternate-network slice controller is configured to send the registration request message to the second network operator associated with the second SIM based on the determined candidate network slice associated with the second SIM.

These and other aspects of various example embodiments disclosed and described herein will be better appreciated and understood when considered in conjunction with the following description and the accompanying drawings. It is understood, however, that the following descriptions, while indicating example embodiments and numerous specific details thereof, are given by way of illustration and not of limitation. Many changes and modifications be made within the scope of the embodiments herein without departing from the spirit thereof, and the embodiments herein include all such modifications.

BRIEF DESCRIPTION OF THE DRAWINGS

Various example embodiments of the present disclosure are illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which:

FIG. 3 is a signal flow diagram illustrating an example method for sending a slice request message to a second network operator when the registration reject message is received from a first network operator, according to various embodiments;

Figure 1:
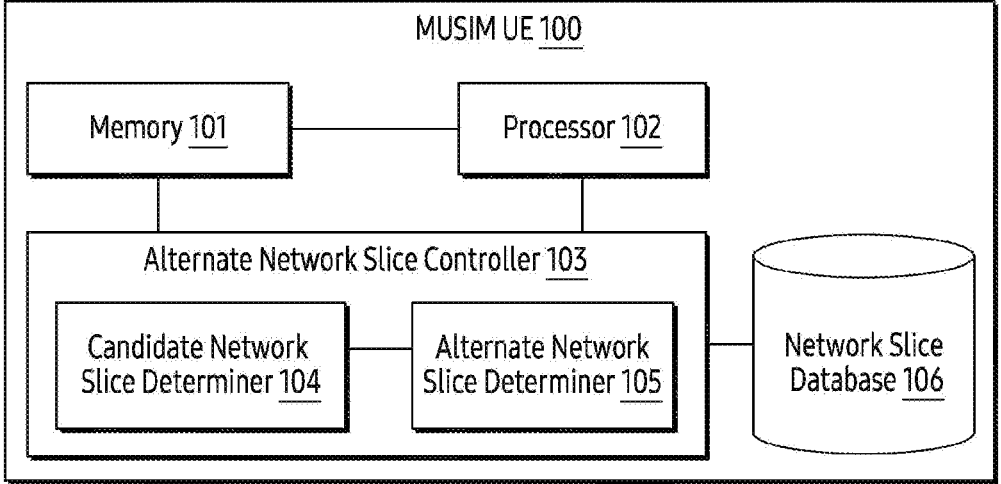
FIG. 1 is a block diagram illustrating an example configuration of a user equipment for management of alternate-network slice in a MUSIM UE, according to various embodiments.

It may be noted that to the extent possible, like reference numerals have been used to represent like elements in the drawings. Further, those of ordinary skill in the art will appreciate that elements in the drawing are illustrated for simplicity and may not have been necessarily drawn to scale. For example, the dimensions of some of the elements in the drawing may be exaggerated relative to other elements to help to improve the understanding of aspects of the disclosure. Furthermore, the elements may have been represented in the drawing by conventional symbols, and the drawings may show only those specific details that are pertinent to the understanding the embodiments of the disclosure so as not to obscure the drawing with details that will be readily apparent to those of ordinary skill in the art having benefit of the description herein.

DETAILED DESCRIPTION

The various example embodiments herein and the various features and advantageous details thereof are explained more fully with reference to the non-limiting example embodiments that are illustrated in the accompanying drawings and detailed in the following description. Descriptions of well-known components and processing techniques may be omitted so as to not unnecessarily obscure the description herein. Also, the various example embodiments described herein are not necessarily mutually exclusive, as various embodiments may be combined with one or more other embodiments to form new embodiments. The term "or" as used herein, refers to a non-exclusive or, unless otherwise indicated. The examples used herein are intended merely to facilitate an understanding of ways in which the embodiments herein can be practiced. Accordingly, the examples are not to be construed as limiting the scope of the embodiments herein.

Various example embodiments are described and illustrated in terms of blocks that carry out a described function or functions. These blocks, which referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and optionally be driven by firmware and software. The circuits, for example, may be embodied in one or more semiconductor chips, or on substrate supports such as printed circuit boards and the like. The circuits of a block be implemented by dedicated hardware, or by a processor (e.g., one or more programmed microprocessors and associated circuitry), or by a combination of dedicated hardware to perform some functions of the block and a processor to perform other functions of the block. Each block of the embodiments be physically separated into two or more interacting and discrete blocks without departing from the scope of the disclosed method. Likewise, the blocks of the embodiments be physically combined into more complex blocks without departing from the scope of the disclosed method.

The accompanying drawings are used to help easily understand various technical features and it is understood that the embodiments presented herein are not limited by the accompanying drawings. As such, the disclosed methods are understood to extend to any alterations, equivalents and substitutes in addition to those which are particularly set out in the accompanying drawings. Although the terms first, second, etc. used herein to describe various elements, these elements are not be limited by these terms. These terms are generally used to distinguish one element from another.

Accordingly, various example embodiments herein disclose a method for management of alternate-network slice in a multi-SIM UE. The method includes storing slice mapping information in a network slice database. The slice mapping information includes a mapping among each candidate network slice of a plurality of network slices associated with a plurality of SIMs of the MUSIM UE. The method includes, determining whether candidate network slice associated with a first SIM of the plurality of SIMs is available. The method includes determining candidate network slice associated with a second SIM based on the stored slice mapping information in the network slice database based on the candidate network slice associated with the first SIM not being available. The method includes sending a registration request message to a second network operator associated with the second SIM based on the determined candidate network slice associated with the second SIM.

Accordingly, various example embodiments herein disclose a MUSIM UE for managing an alternate-network slice a memory. The MUSIM UE includes a processor coupled to the memory, and a network slice database storing slice mapping information in the network slice database. The slice mapping information includes the mapping among each candidate network slice of the plurality of network slices associated with the plurality of SIMs of the MUSIM UE. The MUSIM UE includes an alternate-network slice controller communicatively coupled to the memory, the processor and the network slice database. The alternate-network slice controller is configured to determine whether candidate network slice associated with the first SIM of the plurality of SIMs is available. The alternate-network slice controller is configured to determine the candidate network slice associated with the second SIM based on the stored slice mapping information in the network slice database based on the candidate network slice associated with the first SIM not being available. The alternate-network slice controller is configured to send the registration request message to the second network operator associated with the second SIM based on the determined candidate network slice associated with the second SIM.

In conventional methods, the UE creates slice mapping database with the UE's required slices and slices that are supported by the single network. Main slice which is required by the UE and an alternate slice which is inferior to the main slice belonged to the same network are read from the slice mapping database. Both main slice and alternate slices are requested in a single request by the UE to the network. The slice mapping database maintained at the UE with respect to the single network is shown in Table 1. Providing the alternate slice by the network on the UE's slice request is also applicable for roaming and inter RA-handovers.

TABLE 1

| Requested Slice ID | Alternate Slice ID |
| --- | --- |
| Slice 1 | Slice 2 |
| Slice 2 | Slice 4 |
| Slice 3 | Slice 5 |

Unlike the conventional methods, the MUSIM UE creates slice mapping database with the MUSIM UE's required slices and slices that are supported by multiple networks. A main slice which is required by the MUSIM UE is requested to the SIM 1 network. When the main slice is not available at the SIM1 network, the MUSIM UE requests the main slice to the SIM 2 network rather than managing with the inferior-alternate slice of the SIM 1 network.

In conventional methods, network resources are managed by switching the slice used to support the UE, in a process referred to as slice handover or slice reselection. Here the UE is switched to a new slice operated by the same service provider or a different service provider. Slice switching is happening at network side service provider.

Unlike in conventional methods, the MUSIM UE decides which slice to select from multiple operators (SIM1/SIM2) using the slice mapping database. The MUSIM UE creates slice mapping database with the MUSIM UE's required slices and slices that are supported by multiple networks. Main slice which is required by the MUSIM UE is requested to the SIM 1 network. When the main slice is not available at the SIM1 network, the UE requests the main slice to the SIM 2 network rather than managing with the inferior-alternate slice of the SIM 1 network.

In a conventional method, the first slice and the second slice are operated by the same service provider. In various embodiments the first slice and the second slice are operated by different service providers. In various embodiments the received indication that a slice reselection triggering event has occurred is indicative of a change in the service requirements of the mobile device. There can be several triggers for a slice handover/reselection including: movement of the UE, changes to the mobility requirements of the UE, a slice management event, and in various embodiments network load balancing. A slice management event may include the instantiation of a slice, the termination of a slice or the modification of the capacity a slice. Further the UE can be switched to a new slice operated by the same service provider (intra-operator handover) or a different service provider (inter-operator handover). In addition to mobility related slice reselection, Slice reselection may also be triggered by a determination that the resources allocated to a network slice are overloaded. In this case, slice reselection can be used for load balancing by moving UE traffic from the overloaded slice to another slice. A load monitoring function, for example LM, sends the monitored capacity information (e.g., the monitored slice utilization) to the G-CMM (centralized mobility management) function. The G-CMM function can evaluate the received capacity information. The receipt of the capacity information can serve. Network Slice needs dedicated resources and is limited in the network. When number of users cross the max limit, new users' slice request will be rejected by the network.

Unlike the conventional method, the disclosed MUSIM UE decides which slice to select from multiple operators (SIM1/SIM2) using the database of slice mappings that is stored in the MUSIM UE. Network is planning to provide "alternate slice" to the UE when originally requested slice is not available. This "alternate slice" may be inferior to the original slice and if other network (multi-SIM scenario) is available using disclosed method, UE can check for another network for the original slice rather than managing with inferior-alternate slice on the first network.

In a conventional method, the network Slice needs dedicated resources and is limited in the network. When number of users cross the maximum limit, new users' slice request will be rejected by the network and the network is planning to provide "alternate slice" to the UE when originally requested slice is not available. This "alternate slice" may be inferior to the original slice. This scenario is applicable for Roaming and Inter RA-Handovers as well. Therefore, end user will be benefitted if UE is able to pick the best option for the network slice so that its KPIs (Throughput speed, latency, power consumption) are not degraded when UEs opt for the alternate slice. In any of the current solutions, there is no specified method to handle network slices in multi-sim environment.

Unlike the conventional methods, the UE itself can identify the alternate/compatible slice and communicate it to network. When the slice requested is not available the UE can check if another SIM network (multi-SIM scenario) is available, UE can check for other network for the original slice rather than managing with inferior-alternate slice on the first network. The slice mapping database where primary network slices (initial slide ID requested by the UE to network) are mapped with secondary alternate slices (alternate slices which are requested to network by the UE when initial/primary slice is not available or gets rejected) and use this database for decision making as to which one to select as alternate slice for making the request to network.

Referring now to the drawings and more particularly to FIGS. 1 through 5, where similar reference characters denote corresponding features consistently throughout the figure, these are shown various example embodiments.

FIG. 1 is a block diagram illustrating an example configuration of the MUSIM UE (100) for management of alternate-network slice in the MUSIM UE, according to various embodiments. Referring to FIG. 1, the MUSIM UE (100) may include, but is not limited to a laptop, a palmtop, a desktop, a mobile phone, a smart phone, Personal Digital Assistant (PDA), a tablet, a wearable device, an Internet of Things (IoT) device, a virtual reality device, a foldable device, a flexible device, a display device, an immersive system, or the like.

In an embodiment, the MUSIM UE (100) includes a memory (101), a processor (e.g., including processing circuitry) (102), a network slice database (106), and an alternate network slice controller (e.g., including control circuitry) (103).

The memory (101) is configured to store instructions to be executed by the processor (102). The memory (101) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (101) may, in some examples, be considered a non-transitory storage medium. The term "non-transitory" may indicate that the storage medium is not embodied in a carrier wave or a propagated signal. However, the term "non-transitory" should not be interpreted that the memory (101) is non-movable. In some examples, the memory (101) is configured to store larger amounts of information. In certain examples, a non-transitory storage medium may store data that can, over time, change (e.g., in Random Access Memory (RAM) or cache).

The processor (102) may include various processing circuitry including one or a plurality of processors. The one or the plurality of processors may include a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (102) may include multiple cores and is configured to execute the instructions stored in the memory (101).

The network slice database (106) stores slice mapping information in the network slice database (106), wherein the slice mapping information comprises a mapping among each candidate network slice of a plurality of network slices associated with a plurality of SIMs of the MUSIM UE (100).

In an embodiment, the alternate network slice controller (103) may include various control or processing circuitry and includes a candidate network slice determiner (e.g., including various processing circuitry and/or executable program instructions) (104) and an alternate network slice determiner (e.g., including various processing circuitry and/or executable program instructions) (105). In an embodiment, the alternate network slice controller (103) and the processor (101) might be referred as at least one processor.

In an embodiment, the candidate network slice determiner (104) is configured to determine whether a candidate network slice associated with a first SIM of the plurality of SIMs is available.

In an embodiment, the alternate network slice determiner (105) is configured to determine the candidate network slice associated with a second SIM based on the stored slice mapping information in the network slice database (106) when the candidate network slice associated with the first SIM is not available. The alternate network slice controller (103) sends a registration request message to a second network operator associated with the second SIM based on the determined at least one candidate network slice associated with the second SIM.

The alternate network slice controller (103) determines the candidate network slice of the plurality of network slices associated with the plurality of SIMs based on the stored slice mapping information in the network slice database (106), when the candidate network slice associated with the first SIM is unavailable.

The alternate network slice controller (103) checks the availability of the candidate network slice associated with the first SIM or the candidate network slice associated with the second SIM available. The alternate network slice controller (103) sends a registration request message to the first network operator associated with the first SIM, and receiving a registration response message from the first network operator to determine whether the candidate network slice is associated with the first SIM is available, wherein the registration response message comprises any one of a registration accept message and a registration reject message;

The alternate-network slice controller (103) checks whether the availability of the alternate network slice is associated with the first SIM or the second SIM. The alternate-network slice controller (103) sends a registration request message to the first network operator associated with the first SIM, when the alternate network slice is associated with the first SIM is available, and receiving a registration accept message from the first network operator. In an embodiment, the alternate network slice controller (103) switches the data connection from the first SIM to the second SIM when the alternate network slice is associated with the second SIM is available, sending a registration request message to a second network operator associated with the second SIM, and receiving a registration accept message from the second network operator.

In an embodiment, the MUSIM UE (100) sends the registration request message to the first network operator, wherein the registration request message comprises S-NSSAI about the at least one candidate network slice associated with the first SIM. Also, the MUSIM UE (100) sends the registration request message to the second network operator, wherein the registration request message comprises S-NS- SAI about the at least one candidate network slice associated with the second SIM that is same as the S-NSSAI about the at least one candidate network slice associated with the first SIM.

The MUSIM UE (100) receives information of the plurality of network slices supported by the first network operator associated with the first SIM and information of the plurality of network slices supported by the second network operator associated with the second SIM. The alternate network slice controller (103) determines the candidate network slice supported by the first network operator and the candidate network slice supported by the second network operator. The alternate network slice controller (103) creates the slice mapping information by mapping the determined candidate network slice associated with the first SIM to the candidate network slice associated with the second SIM. The network slice database (106) stores the created slice mapping information.

In an embodiment, the alternate network slice controller (103) updates the candidate network slice associated with the first SIM is unavailable in the network slice database (106) when the candidate network slice associated with the first SIM is unavailable or upon receiving the registration reject message from the first network operator associated with the first SIM.

In an embodiment, the MUSIM UE (100) sends the registration request message to the first network operator associated with the first SIM and receives the registration reject message from the first network operator in response to the registration request message. The alternate network slice controller (103) determines the candidate network slice is not available based on the received registration reject message. Also, the alternate network slice controller (103) checks the slice mapping information stored in the network slice database (106) to determine the candidate network slice associated with a second SIM of the plurality of SIMs when the at least one candidate network slice associated with the first SIM is not available.

The alternate network slice controller (103) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

At least one of the plurality of modules/components of the alternate network slice controller (103) may be implemented through an AI model. A function associated with the AI model may be performed through memory (101) and the processor (102). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning may refer, for example, to, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may include a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), deep Q-networks, or the like.

The learning process may include a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

In an embodiment, when the alternate network slice controller (103) determines the critical candidate network slice, the alternate network slice controller (103) prioritizing the critical candidate network slice based on determined critical candidate network slice. Further, the alternate network slice controller (103) checks the network slice database whether the critical candidate network slice is available in the first network operator and the second network operator based on the prioritization. When the critical candidate network slice is available in the first network operator, the MUSIM UE (100) sends the registration request message to the first network operator. Similarly, when the critical candidate network slice is available in the second network operator, the MUSIM UE (100) sends the registration request message to the second network operator.

Although FIG. 1 shows example hardware elements of the MUSIM UE (100) it is to be understood that various embodiments are not limited thereon. In various example embodiments, the MUSIM UE (100) may include less or more number of elements. Further, the labels or names of the elements are used for illustrative purpose and do not limit the scope of the disclosure. One or more components can be combined together to perform same or substantially similar function.

The terms "first network operator" and "SIM1 network" are used interchangeably throughout the disclosure.

The terms "second network operator", "SIM2 network" and "alternate network" are used interchangeably throughout the disclosure.

Figure 2:
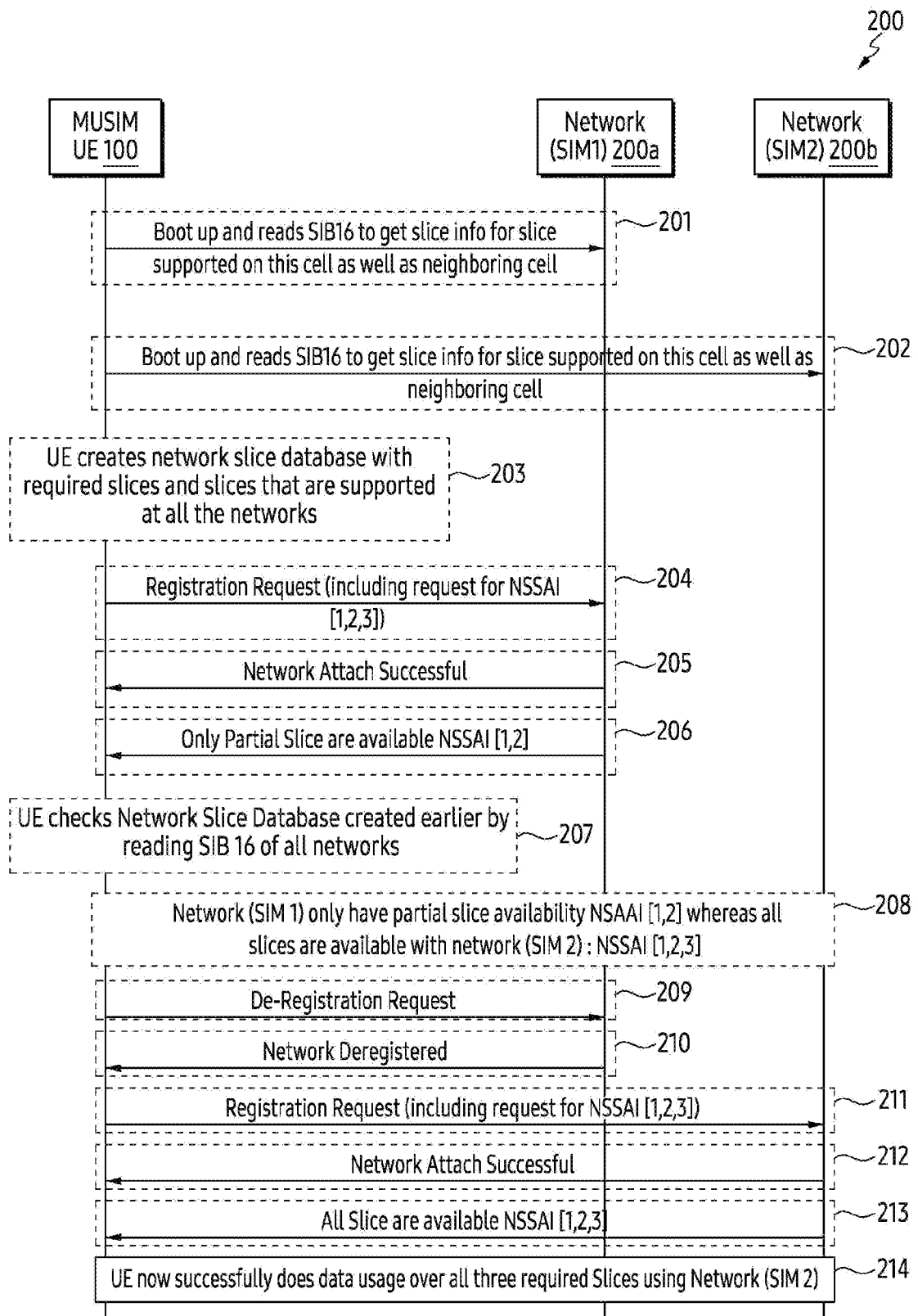
FIG. 2 is a signal flow diagram illustrating an example method for switching data connection from the first SIM to the second SIM based on slice availability, according to various embodiments.

FIG. 2 is a signal flow diagram (200) illustrating an example method for switching data connection from the first SIM to the second SIM based on slice availability, according to various embodiments. Also, the diagram illustrates management of alternate-network slice in a MUSIM UE. Here two different networks are used and they are SIM1 200a and SIM2 200b, where the SIM1 and SIM2 can be any service provider based on the user selection. All the System Information Blocks (SIB) are broadcast periodically regardless of whether the UE requires or not. The supported slices information of current cell and neighbor cell is broadcasted in SIB16.

At 201, the MUSIM UE (100) boots up and reads the SIB16 to get slice information for the slice supported on the current cell as well as neighboring cell of the SIM1 network (200a).

At 202, the MUSIM UE (100) boots up and reads the SIB16 to get slice information for the slice availability on the current cell as well as neighboring cell of the SIM2 network (200b).

At 203, the MUSIM UE (100) creates network slice database (106) based on the slices required by the MUSIM UE (100) and the slices that are supported by the SIM1 network (200a) and the SIM2 network (200b) which are read from SIB16 of the respective networks. Table 2 shows the multi-SIM network slice database (106) created by the UE (100). The network slice database (106) stores the mapping between the requested slice ID with the alternate slice ID associated with the SIM2 and also SIM1 in the prioritized manner, where the prioritization is performed based on the critical level of the slice which is requested by the MUSIM UE (100).

TABLE 2

| Requested Slice ID | Alternate Slice ID (Higher priority) | Alternate Slice ID (Lower priority) |
|---|---|---|
| Sim1-Slice 1 | Sim2-Slice 1 | Sim1-Slice 2 |
| Sim1-Slice 2 | Sim2-Slice 2 | Sim1-Slice 4 |
| Sim1-Slice 3 | Sim1-Slice 5 | Sim 1-Slice 6 |

At 204, the MUSIM UE (100) sends registration request message to the SIM1 network (200a). The registration request message includes required Network Slice Selection Assistance Information (NSSAI) by the UE (100). The UE sends request for NSSAI [1, 2, 3] slices, where the identification and selection of a network slice is Single-Network Slice Selection Assistance Information (S-NSSAI). The S-NSSAI identifies a network slice, where the S-NSSAI is comprised of a Slice/Service type (SST) that is expected network slice behaviour in terms of features and services and a Slice Differentiator (SD) that is <optional> complements the slice/service type(s) to differentiate amongst multiple network slices of the same slice/service type In an embodiment, the MUSIM UE (100) sends Single-Network Slice Selection Assistance Information (S-NSSAI) in the registration request message to the network for assisting the network to select a particular network slice instance. An S-NSSAI is comprised of a Slice/Service type (SST), which refers to the expected network slice behavior in terms of features and services and a Slice Differentiator (SD), which is an optional information that complements the SST(s) to differentiate amongst multiple network slices of the same SST.

At 205, SIM1 network (200a) sends successful attachment message to the UE (100).

At 206, SIM1 network (200a) informs NSSAI [1, 2] slices availability to the UE (100). The required original slices are not available at the SIM1 network (200a).

At 207, the MUSIM UE (100) checks the network slice database (106) for the required slices supported at the SIM2 network (200b) rather than managing with the partially available slices of the SIM1 network (200a).

At 208, the MUSIM UE (100) determines that all the required slices NSSAI [1, 2, 3] are supported at the SIM2 network (200b).

At 209, the MUSIM UE (100) sends de-registration request message to the SIM1 network (200a) to send registration request message to the SIM2 network (200b) to get the required slices Since only partial slices are available at the SIM1 network (200a).

At 210, the SIM1 network (200a) sends de-registration message to the UE (100), to detach the MUSIM UE (100) from the network.

At 211, the MUSIM UE (100) sends registration request message including request for NSSAI [1, 2, 3] slices to the SIM2 network (200b).

At 212, the SIM2 network (200b) sends successful attachment message to the MUSIM UE (100) indicating the successful attachment of the MUSIM UE (100) to the SIM2 network (200b).

At 213, the SIM2 network (200b) informs the MUSIM UE (100) that all the required NSSAI [1, 2, 3] slices are available.

At step 214, the MUSIM UE (100) successfully does data usage over all three network slices NSSAI [1, 2, 3] of the SIM2 network (200b).

The various actions, acts, blocks, steps, or the like in the method may be performed in the order presented, in a different order or simultaneously. Further, in various embodiments, some of the actions, acts, blocks, steps, or the like are omitted, added, modified, skipped, or the like without departing from the scope of the disclosed method.

In an embodiment, the disclosed method may be the network agnostic slice registration mechanism, using the MUSIM UE (100) side solution. Since the network slice database (106) is used for determining alternate slice to each of the original required slices having SIM IDs also mapped and alternate slices can be from different SIM (network), therefore the slice selection mechanism becomes network agnostic.

FIG. 3 is a signal flow diagram (300) illustrating an example method for sending a slice request message to a second network operator when the registration reject message is received from a first network operator, according to various embodiments. Supported slice information of the current cell and the neighbor cells may be broadcast in SIB16 by the network. The MUSIM UE (100) creates network slice database (106) based on the slices required by the MUSIM UE (100) and the slices that are supported by the SIM1 network (200a) and the SIM2 network (200b) which are read from SIB16 of the respective networks. Table 2 shows an example of the multi-SIM network slice database (106) created by the UE (100). When the original slice required by the MUSIM UE (100) is not available at the SIM1 network (200a), the MUSIM UE (100) receives the slice request rejection message from the SIM1 network (200a). The MUSIM UE (100) checks the network slice database (106) for the alternate required slices supported at the SIM2 network (200b) rather than managing with the inferior-alternate slices of the SIM1 network (200a). When the MUSIM UE (100) realizes the MUSIM UE (100) realizes that the alternate required slice is available at the SIM2 network (200b), the MUSIM UE (100) detaches from the SIM1 network (200a) and sends registration request message to the SIM2 network (200b).

At 301, the MUSIM UE (100) sends registration request to an Access Management Function (AMF) (310) specifying the NSSAIs and network slicing indication required by the UE (100).

At 302, the AMF (320) sends the slice information request to the Unified Data Management (UDM) (340).

At 303, the UDM (340) sends the slice information response to the AMF (320).

At 304, the AMF (320) sends the slice selection request (UE capability) to a Network Slice Selection Function (NSSF) (330).

At 305, the NSSF (330) sends the slice selection response (service specific scheme) to the AMF (320).

At 306, the Authentication Server Function (AUSF) (350) authenticates the UE (100).

At 307, the AMF (320) sends the registration accept message to the UE (100), where the registration accept message includes allowed NSSAI, configured NSSAI, network slicing indication, and a NSSAI inclusion Mode.

In an embodiment, when primary network slice request is rejected, the MUSIM UE (100) can initiate alternate-network slice request based on the mapping MUSIM UE (100)

has maintained in the network slice database (106). This new request can be on a new SIM network as well, based on the mapping MUSIM UE (100) has kept in the network slice database (106). For example, when MUSIM UE (100) receives the registration reject message for the network slice1 from the SIM1 network, the MUSIM UE (100) can retry for network slice1 on SIM2 network. If the network slice1 request on SIM2 network also fails, then MUSIM UE (100) can request for and manage with the inferior network slice2 on SIM1 network.

The various actions, acts, blocks, steps, or the like in the method may be performed in the order presented, in a different order or simultaneously. Further, in various embodiments, some of the actions, acts, blocks, steps, or the like may be omitted, added, modified, skipped, or the like without departing from the scope of the disclosed method.

Figure 4:
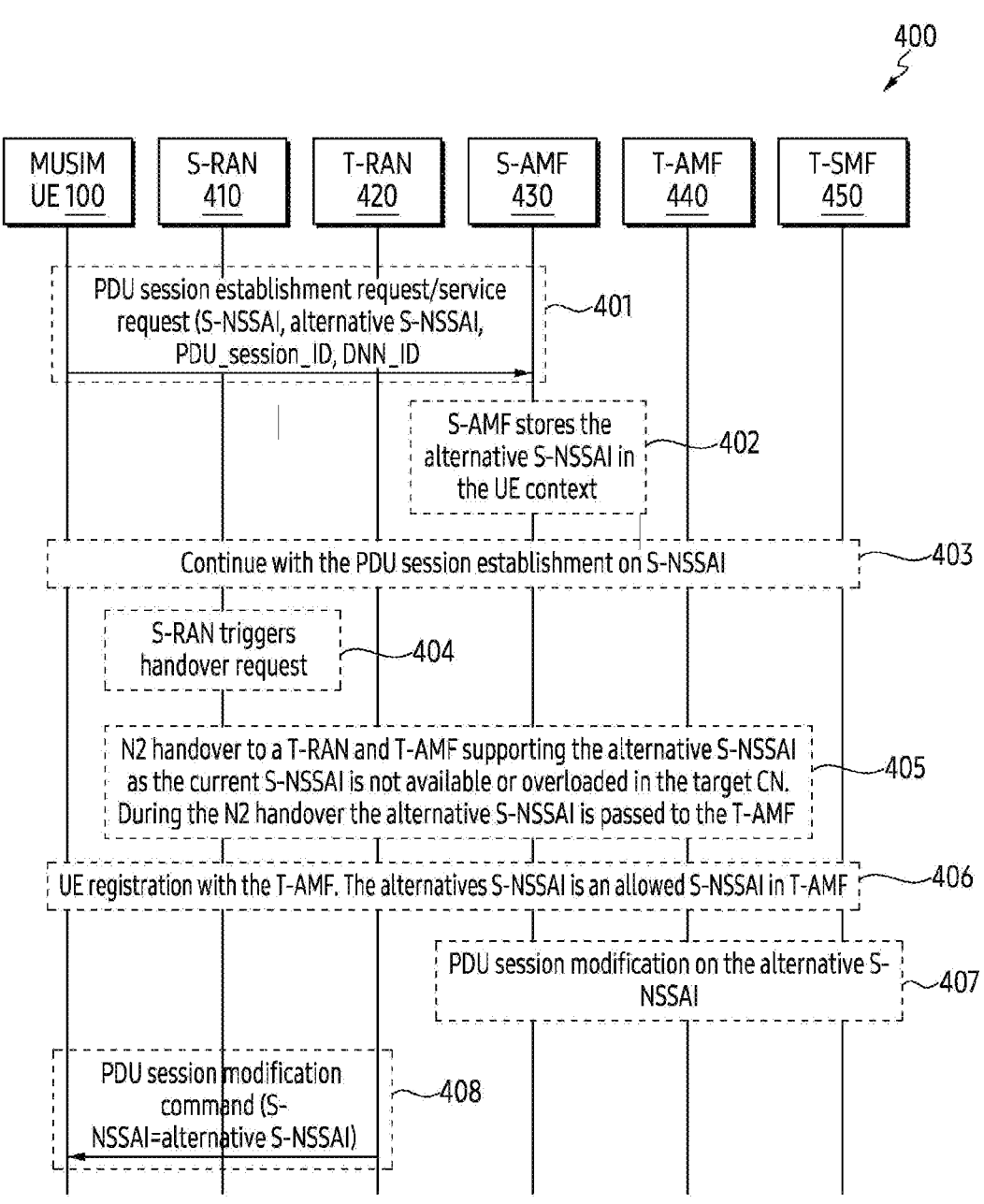
FIG. 4 is a signal flow diagram illustrating an example method for sending a registration request message to the first network operator associated with the first SIM when an alternate network slice is associated with the first SIM is available, according to various embodiments.

FIG. 4 is a signal flow diagram (400) illustrating an example method for sending a registration request message to the first network operator associated with the first SIM when an alternate network slice is associated with the first SIM is available, according to various embodiments.

In an embodiment, at 401, when the alternate network slice is also in same network, the MUSIM UE (100) sends PDU session establishment request/service request (S-NS-SAI, alternative S-NSSAI, PDU_session_ID, DNN_ID to the Source AMF (S-AMF) (430). For example, the PDU session establishment request or the service request might include S-NSSAI, alternative S-NSSAI, PDU_session_ID, and DNN_ID.

At 402, the method includes, storing the alternative S-NS-SAI in the UE context, by the S-AMF (430).

At 403, the method includes, continue the MUSIM UE (100) with the PDU session establishment on S-NSSAI.

At 404, the method includes triggering the shared Radio Access Network (S-RAN) (410) handover request.

At 405, the method includes, handover the N2 to a T-RAN and T-AMF (440) supporting the alternative S-NSSAI as the current S-NSSAI is not available or overloaded in the target CN. During the N2 handover the alternative S-NSSAI is passed to the T-AMF (440).

At 406, the method includes, registering the MUSIM UE (100) with the T-AMF (440). The alternatives S-NSSAI is an allowed S-NSSAI in T-AMF (440).

At 407, the method includes modification of the PDU session on the alternative S-NSSAI.

At 408, the method includes T-RAN (420) sends the PDU session modification command (S-NSSAI=alternative S-NSSAI) to the UE (100). For example, the PDU session modification command might include S-NSSAI which corresponds alternative S-NSSAI.

The various actions, acts, blocks, steps, or the like in the method may be performed in the order presented, in a different order or simultaneously. Further, in various embodiments, some of the actions, acts, blocks, steps, or the like may be omitted, added, modified, skipped, or the like without departing from the scope of the disclosed method.

Figure 5:
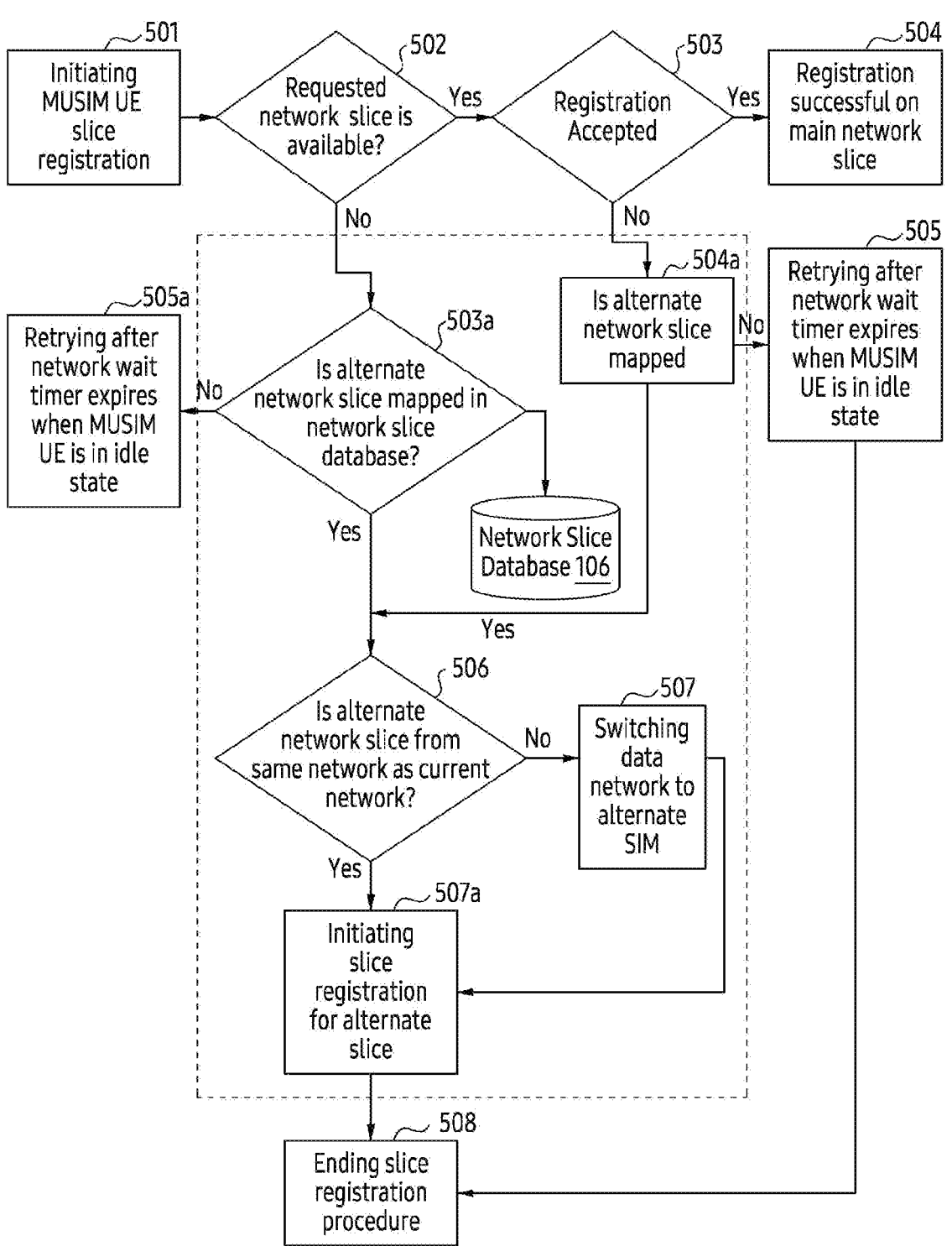
FIG. 5 is a flowchart illustrating an example method for management of alternate-network slice in a MUSIM UE, according to various embodiments.

FIG. 5 is a flowchart illustrating an example method for management of alternate-network slice in a MUSIM UE, according to various embodiments.

At 501, the method includes initiating MUSIM UE (100) slice registration by sending the slice registration request to the respective network.

At 502, the method includes determining whether the requested slice is available in the respective network.

At 503, the method includes determining whether registration is accepted by the respective network when the requested slice is available.

At 503*a*, the method includes MUSIM UE (100) checking for the alternate network slice in alternate network when the requested slice is not available.

At 504, the method includes registration being successful on main slice.

At 504*a*, the method includes the MUSIM UE (100) checking whether the alternate network slice is mapped, when the registration is not accepted.

At 505, the method includes the MUSIM UE (100) retrying after network wait timer expires when the MUSIM UE (100) is in idle state when the alternate network slice is not mapped.

At 505*a*, the method includes the MUSIM UE (100) retrying after network wait timer expires when MUSIM UE (100) is in idle state when the alternate network slice is not mapped in the network slice database (106).

At 506, the method includes the MUSIM UE (100) checking whether the alternate network slice is from same network as current network or not.

At 507, the method includes switching the data network to the alternate SIM when the alternate network slice is not from same network and initiating slice registration for alternate slice when the alternate network slice is from alternate network as represented in 507*a*.

At 507*a*, the method includes initiating slice registration for alternate slice when the alternate network slice is from same network.

At 508, the method includes Ending slice registration procedure.

The various actions, acts, blocks, steps, or the like in the method may be performed in the order presented, in a different order or simultaneously. Further, in various embodiments, some of the actions, acts, blocks, steps, or the like may be omitted, added, modified, skipped, or the like without departing from the scope of the disclosed method.

In an embodiment, the MUSIM UE (100) can read SIB16 for both SIM networks and choose the best SIM based on critical slice availability. For example, when the MUSIM UE (100) needs 4 slices (1,2,3,4), at that time, when the SIM1 Network has Slice support for 1, 2 and SIM 2 network has slice support for 1, 2, 3, 4. The MUSIM UE (100) will read both SIM1 and SIM2 Network's SIB16 and will switch to SIM2 Network and register for all 4 slices.

In an embodiment, when the MUSIM UE (100) needs 4 slices (1,2,3,4) and slice (2,3) are must-have/critical slices as per user preference. At that time, when the SIM1 Network has Slice support for 1, 2 and SIM2 Network has Slice support for 2, 3, 4 may refer, for example, to, the MUSIM UE (100) reading both SIM1 and SIM2 Network's SIB16 and will switch to SIM2 Network and register for all slices (2,3,4) and can get the alternate slice for slice1 on SIM2 Network.

The MUSIMI UE (100) can identify best suited original Slice network and then trigger the alternate slice for the remaining (not available) slices on that network.

According to embodiments, method for managing alternate-network slice in a Multi-SIM (MUSIM) User Equipment (UE), comprises storing, by the MUSIM UE, slice mapping information in a network slice database. The slice mapping information comprises a mapping among each candidate network slice of a plurality of network slices associated with a plurality of SIMs of the MUSIM UE. The method comprises determining, by the MUSIM UE, whether at least one candidate network slice associated with a first SIM of the plurality of SIMs is available. The method comprises determining, by the MUSIM UE, at least one candidate network slice associated with a second SIM based on the stored slice mapping information in the network slice database based on the at least one candidate network slice associated with the first SIM not being available. The method comprises sending, by the MUSIM UE, a registration request message to a second network operator associated with the second SIM based on the determined at least one candidate network slice associated with the second SIM.

In an embodiment, the method comprises determining, by the MUSIM UE, the at least one candidate network slice of the plurality of network slices associated with the plurality of SIMs based on the stored slice mapping information in the network slice database based on the at least one candidate network slice associated with the first SIM being unavailable.

In an embodiment, the method comprises determining, by the MUSIM UE, that the at least one candidate network slice associated with the first SIM or the second SIM of the plurality of SIMs is available. The method comprises performing, by the MUSIM UE, at least one of: sending a registration request message to a first network operator associated with the first SIM, and receiving a registration response message from the first network operator to determine whether the at least one candidate network slice associated with the first SIM is available, wherein the registration response message comprises any one of a registration accept message and a registration reject message; or switching a data connection from the first SIM to the second SIM based on the at least one candidate network slice associated with the second SIM being available, sending the registration request message to the second network operator associated with the second SIM, and receiving a registration accept message from the second network operator.

In an embodiment, in the sending, by the MUSIM UE, the registration request message to the first network operator, the registration request message comprises Single Network Slice Selection Assistance Information (S-NSSAI) about the at least one candidate network slice associated with the first SIM.

In an embodiment, in the sending, by the MUSIM UE, the registration request message to the second network operator, the registration request message comprises S-NSSAI about the at least one candidate network slice associated with the second SIM same as the S-NSSAI about the at least one candidate network slice associated with the first SIM.

In an embodiment, the storing, by the MUSIM UE, the slice mapping information in the network slice database comprises receiving, by the MUSIM UE, information of the plurality of network slices supported by the first network operator associated with the first SIM and information of the plurality of network slices supported by the second network operator associated with the second SIM. The storing, by the MUSIM UE, the slice mapping information in the network slice database comprises determining, by the MUSIM UE, the at least one candidate network slice supported by the first network operator and the at least one candidate network slice supported by the second network operator. The storing, by the MUSIM UE, the slice mapping information in the network slice database comprises creating, by the MUSIM UE, the slice mapping information by mapping the determined at least one candidate network slice associated with the first SIM to the at least one candidate network slice associated with the second SIM. The storing, by the MUSIM UE, the slice mapping information in the network slice database comprises storing, by the MUSIM UE, the created slice mapping information in the network slice database.

In an embodiment, in the updating, by the MUSIM UE, the at least one candidate network slice associated with the first SIM is unavailable in the network slice database based on the at least one candidate network slice associated with the first SIM being unavailable or upon receiving a registration reject message from the first network operator associated with the first SIM.

In an embodiment, the determining, by the MUSIM UE, the at least one candidate network slice is not available comprises sending, by the MUSIM UE, the registration request message to the first network operator associated with the first SIM. The determining, by the MUSIM UE, the at least one candidate network slice is not available comprises receiving, by the MUSIM UE, the registration reject message from the first network operator in response to the registration request message. The determining, by the MUSIM UE, the at least one candidate network slice is not available comprises determining, by the MUSIM UE, the at least one candidate network slice is not available based on the received registration reject message.

In an embodiment, the determining, by the MUSIM UE, the at least one candidate network slice associated with the second SIM comprises checking, by the MUSIM UE, the slice mapping information stored in the network slice database to determine the at least one candidate network slice associated with the second SIM of the plurality of SIMs based on the at least one candidate network slice associated with the first SIM not being available.

In an embodiment, the method comprises determining, by the MUSIM UE, at least one critical candidate network slice based on the received information of the plurality of network slices supported by the first network operator associated with the first SIM and information of the plurality of network slices supported by the second network operator associated with the second SIM. The method comprises prioritizing, by the MUSIM UE, the at least one critical candidate network slice in the network slice database based on the determined at least one critical candidate network slice. The method comprises checking, by the MUSIM UE, the network slice database whether the at least one critical candidate network slice associated with the first SIM is available based on the prioritization. The method comprises performing, by the MUSIM UE, at least one of sending, by the MUSIM UE, the registration request message to the first network operator based on the at least one critical candidate network slice associated with the first SIM being available or sending, by the MUSIM UE, the registration request message to the second network operator based on the at least one critical candidate network slice associated with the first SIM not being available.

In an embodiment, the slice mapping information comprises a priority information associated with each candidate network slice of the plurality of network slices associated with the plurality of SIMs of the MUSIM UE.

According to embodiments, a MUSIM UE configured to manage an alternate-network slice, comprises a memory. The MUSIM UE comprises a processor coupled to the memory. The MUSIM UE comprises a network slice database configured to store slice mapping information in the network slice database. The slice mapping information comprises a mapping among each candidate network slice of a plurality of network slices associated with a plurality of SIMs of the MUSIM UE. The MUSIM UE comprises an alternate-network slice controller communicatively coupled to the memory, the processor and the network slice database. The alternate-network slice controller is configured to determine whether at least one candidate network slice associated with a first SIM of the plurality of SIMs is available. The alternate-network slice controller is configured to determine the at least one candidate network slice associated with a second SIM based on the stored slice mapping information in the network slice database based on the at least one candidate network slice associated with the first SIM not being available. The alternate-network slice controller is configured to send a registration request message to a second network operator associated with the second SIM based on the determined at least one candidate network slice associated with the second SIM.

In an embodiment, the alternate-network slice controller is further configured to: determine the at least one candidate network slice of the plurality of network slices associated with the plurality of SIMs based on the stored slice mapping information in the network slice database based on the at least one candidate network slice associated with the first SIM being unavailable.

In an embodiment, the alternate-network slice controller is configured to determine the at least one candidate network slice is associated with the first SIM or the second SIM of the plurality of SIMs is available. The alternate-network slice controller is configured to perform at least one of: send a registration request message to the first network operator associated with the first SIM, and receive a registration response message from the first network operator to determine whether the at least one candidate network slice associated with the first SIM is available, wherein the registration response message comprises any one of a registration accept message and a registration reject message; or switch a data connection from the first SIM to the second SIM based on the at least one candidate network slice associated with the second SIM being available, send the registration request message to the second network operator associated with the second SIM, and receive a registration accept message from the second network operator.

In an embodiment, the MUSIM UE is configured to send the registration request message to the first network operator, wherein the registration request message comprises S-NSSAI about the at least one candidate network slice associated with the first SIM.

In an embodiment, the MUSIM UE is configured to send the registration request message to the second network operator, wherein the registration request message comprises S-NSSAI about the at least one candidate network slice associated with the second SIM the same as the S-NSSAI about the at least one candidate network slice associated with the first SIM.

In an embodiment, the alternate-network slice controller is configured to receive information of the plurality of network slices supported by the first network operator associated with the first SIM and information of the plurality of network slices supported by the second network operator associated with the second SIM. The alternate-network slice controller is configured to determine the at least one candidate network slice supported by the first network operator and the at least one candidate network slice supported by the second network operator. The alternate-network slice controller is configured to create the slice mapping information by mapping the determined at least one candidate network slice associated with the first SIM to the at least one candidate network slice associated with the second SIM. The alternate-network slice controller is configured to store the created slice mapping information in the network slice database.

In an embodiment, the alternate-network slice controller is configured to update the at least one candidate network slice associated with the first SIM unavailable in the network slice database based on the at least one candidate network slice associated with the first SIM being unavailable or upon receiving the registration reject message from the first network operator associated with the first SIM.

In an embodiment, the alternate-network slice controller is configured to send the registration request message to the first network operator associated with the first SIM. The alternate-network slice controller is configured to receive the registration reject message from the first network operator in response to the registration request message. The alternate-network slice controller is configured to determine the at least one candidate network slice is not available based on the received registration reject message.

In an embodiment, the alternate-network slice controller is configured to check the slice mapping information stored in the network slice database to determine the at least one candidate network slice associated with a second SIM of the plurality of SIMs based on the at least one candidate network slice associated with the first SIM not being available.

In an embodiment, the alternate-network slice controller is configured to determine at least one critical candidate network slice based on the received information of the plurality of network slices supported by the first network operator associated with the first SIM and information of the plurality of network slices supported by the second network operator associated with the second SIM. The alternate-network slice controller is configured to prioritize the at least one critical candidate network slice in the network slice database based on the determined at least one critical candidate network slice. The alternate-network slice controller is configured to check the network slice database to determine whether the at least one critical candidate network slice associated with the first SIM is available based on the prioritization. The alternate-network slice controller is configured to perform at least one of send the registration request message to the first network operator based on the at least one critical candidate network slice associated with the first SIM being available; or send the registration request message to the second network operator based on the at least one critical candidate network slice associated with the first SIM not being available.

In an embodiment, the slice mapping information comprises a priority information associated with each candidate network slice of the plurality of network slices associated with the plurality of SIMs of the MUSIM UE.

According to embodiments, a method performed by a Multi-SIM (MUSIM) User Equipment (UE) for managing alternate-network slice, comprising storing slice mapping information in a network slice database. The slice mapping information comprises a mapping among each candidate network slice of a plurality of network slices associated with a plurality of SIMs of the MUSIM UE. The method comprises sending, to a first network operator associated with a first SIM of the plurality of SIMs, a registration request message for at least one first candidate network slice associated with the first SIM. The method comprises receiving, from the first network operator, a registration response message rejecting the at least one first candidate network slice in response to the registration request message. The method comprises determining at least one second candidate network slice associated with a second SIM based on the stored slice mapping information in the network slice database based on receiving the registration response message. The method comprises sending, to a second network operator associated with the second SIM, to a registration request message for the at least one second candidate network slice associated with the second SIM.

In an embodiment, the method comprises determining the at least one second candidate network slice of the plurality of network slices associated with the plurality of SIMs based on the stored slice mapping information in the network slice database based on the at least first one candidate network slice associated with the first SIM being unavailable in response to receiving the registration response message.

In an embodiment, the method comprises switching a data connection from the first SIM to the second SIM based on the at least one second candidate network slice associated with the second SIM being available. The method comprises sending the registration request message to the second network operator associated with the second SIM. The method comprises receiving a registration accept message from the second network operator In an embodiment, the sending the registration request message to the first network operator, the registration request message comprises Single Network Slice Selection Assistance Information (S-NSSAI) about the at least one first candidate network slice associated with the first SIM.

In an embodiment, the sending the registration request message to the second network operator, wherein the registration request message comprises S-NSSAI about the at least one second candidate network slice associated with the second SIM same as the S-NSSAI about the at least one first candidate network slice associated with the first SIM.

In an embodiment, the storing the slice mapping information in the network slice database comprises receiving, from the first network operator, information on a plurality of network slices supported by the first network operator and receiving, from the second network operator, information on plurality of network slices supported by the second network operator. The storing the slice mapping information in the network slice database comprises determining the at least one first candidate network slice supported by the first network operator and the at least one second candidate network slice supported by the second network operator. The storing the slice mapping information in the network slice database comprises creating the slice mapping information by mapping the at least one first candidate network slice associated with the first SIM to the at least one second candidate network slice associated with the second SIM. The storing the slice mapping information in the network slice database comprises storing the created slice mapping information in the network slice database.

In an embodiment, the method comprises updating the at least one first candidate network slice associated with the first SIM is unavailable in the network slice database based on the at least one first candidate network slice associated with the first SIM being unavailable or upon receiving the registration response message from the first network operator associated with the first SIM.

In an embodiment, the determining the at least one second candidate network slice associated with the second SIM comprises checking the slice mapping information stored in the network slice database to determine the at least one second candidate network slice associated with the second SIM of the plurality of SIMs based on the at least one first candidate network slice associated with the first SIM being unavailable.

In an embodiment, the method further comprises determining at least one critical candidate network slice based on the received information of the plurality of network slices supported by the first network operator associated with the first SIM and information of the plurality of network slices supported by the second network operator associated with the second SIM. The method further comprises prioritizing the at least one critical candidate network slice in the network slice database based on the determined at least one critical candidate network slice. The method further comprises checking the network slice database whether the at least one critical candidate network slice associated with the first SIM is available based on the prioritization. The method further comprises sending the registration request message to the first network operator based on the at least one critical candidate network slice associated with the first SIM being available. The method further comprises sending the registration request message to the second network operator based on the at least one critical candidate network slice associated with the first SIM being unavailable.

In an embodiment, the slice mapping information comprises a priority information associated with each candidate network slice of the plurality of network slices associated with the plurality of SIMs of the MUSIM UE.

According to embodiments, a MUSIM UE configured to manage an alternate-network slice, comprises a memory. The MUSIM UE comprises at least one processor coupled to the memory. The MUSIM UE comprises a network slice database configured to store slice mapping information in the network slice database, wherein the slice mapping information comprises a mapping among each candidate network slice of a plurality of network slices associated with a plurality of SIMs of the MUSIM UE. The at least one processor is configured to send, to a first network operator associated with a first SIM of the plurality of SIMs, a registration request message for at least one first candidate network slice associated with the first SIM. The at least one processor is configured to receive, from the first network operator, a registration response message rejecting the at least one first candidate network slice in response to the registration request message. The at least one processor is configured to determine at least one second candidate network slice associated with a second SIM based on the stored slice mapping information in the network slice database based on receiving the registration response message. The at least one processor is configured to send, to a second network operator associated with the second SIM, to a registration request message for the at least one second candidate network slice associated with the second SIM.

In an embodiment, the at least one processor is configured to switch a data connection from the first SIM to the second SIM based on the at least one second candidate network slice associated with the second SIM being available. The at least one processor is configured to send the registration request message to the second network operator associated with the second SIM. The at least one processor is configured to receive a registration accept message from the second network operator.

In an embodiment, the at least one processor is configured to send the registration request message to the first network operator, wherein the registration request message comprises S-NSSAI about the at least one first candidate network slice associated with the first SIM.

In an embodiment, the at least one processor is configured to send the registration request message to the second network operator, wherein the registration request message comprises S-NSSAI about the at least one candidate network slice associated with the second SIM same as the S-NSSAI about the at least one first candidate network slice associated with the first SIM.

In an embodiment, the at least one processor is configured to receive, from the first network operator, information on a plurality of network slices supported by the first network operator and receiving, from the second network operator, information on a plurality of network slices supported by the second network operator. The at least one processor is configured to determine the at least one first candidate network slice supported by the first network operator and the at least one second candidate network slice supported by the second network operator. The at least one processor is configured to create the slice mapping information by mapping the determined at least one first candidate network slice associated with the first SIM to the at least one second candidate network slice associated with the second SIM. The at least one processor is configured to store the created slice mapping information in the network slice database.

In an embodiment, the at least one processor is configured to update the at least one first candidate network slice associated with the first SIM unavailable in the network slice database based on the at least one first candidate network slice associated with the first SIM being unavailable or upon receiving the registration response message from the first network operator associated with the first SIM.

In an embodiment, the at least one processor is configured to check the slice mapping information stored in the network slice database to determine the at least one second candidate network slice associated with a second SIM of the plurality of SIMs based on the at least one first candidate network slice associated with the first SIM being unavailable.

In an embodiment, the at least one processor is configured to determine at least one critical candidate network slice based on the received information of the plurality of network slices supported by the first network operator associated with the first SIM and information of the plurality of network slices supported by the second network operator associated with the second SIM. The at least one processor is configured to prioritize the at least one critical candidate network slice in the network slice database based on the determined at least one critical candidate network slice. The at least one processor is configured to check the network slice database to determine whether the at least one critical candidate network slice associated with the first SIM is available based on the prioritization. The at least one processor is configured to send the registration request message to the first network operator based on the at least one critical candidate network slice associated with the first SIM being available. The at least one processor is configured to send the registration request message to the second network operator based on the at least one critical candidate network slice associated with the first SIM being unavailable.

In an embodiment, the slice mapping information comprises a priority information associated with each candidate network slice of the plurality of network slices associated with the plurality of SIMs of the MUSIM UE.

According to embodiments, a non-transitory computer-readable storage medium, when executed by at least one processor of a MUSIM UE comprising a memory and a network slice database configured to store slice mapping information in the network slice database, wherein the slice mapping information comprises a mapping among each candidate network slice of a plurality of network slices associated with a plurality of SIMs of the MUSIM UE, stores one or more programs including instructions that cause to send, to a first network operator associated with a first SIM of the plurality of SIMs, a registration request message for at least one first candidate network slice associated with the first SIM. The non-transitory computer-readable storage medium when executed by the at least one processor of the MUSIM UE, stores one or more programs including instructions that cause to receive, from the first network operator, a registration response message rejecting the at least one first candidate network slice in response to the registration request message. The non-transitory computer-readable storage medium when executed by the at least one processor of the MUSIM UE, stores one or more programs including instructions that cause to determine at least one second candidate network slice associated with a second SIM based on the stored slice mapping information in the network slice database based on receiving the registration response message. The non-transitory computer-readable storage medium when executed by the at least one processor of the MUSIM UE, stores one or more programs including instructions that cause to send, to a second network operator associated with the second SIM, to a registration request message for the at least one second candidate network slice associated with the second SIM.

While the disclosure has been illustrated and described with reference to various example embodiments, it will be understood that the various example embodiments are intended to be illustrative, not limiting. It will be further understood, by those skilled in the art, that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a multi-universal subscriber identity module (MUSIM) user equipment (UE) for managing alternate-network slice, the method comprising:

storing slice mapping information in a network slice database, wherein the slice mapping information comprises a mapping relationship among a first candidate network slice of the first SIM, a second candidate network slice of the first SIM, and a candidate network slice of a second SIM, wherein the slice mapping information indicates that the candidate network slice of the second SIM has a higher priority than the second candidate network slice of the first SIM as the alternate-network slice;

transmitting, to a first network operator associated with the first SIM, a registration request message for the first candidate network slice of the first SIM;

receiving, from the first network operator, a registration response message rejecting the first candidate network slice in response to the registration request message;

determining the candidate network slice of the second SIM based on the stored slice mapping information in the network slice database in response to receiving the registration response message rejecting the first candidate network slice; and transmitting, to a second network operator associated with the second SIM, a registration request message for the candidate network slice of the second SIM.

2. The method of claim 1, wherein the determining of the candidate network slice of the second SIM comprises:

determining the candidate network slice of the second SIM based on the stored slice mapping information in the network slice database according to the first candidate network slice of the first SIM being unavailable in response to receiving the registration response message.

3. The method of claim 1, wherein the transmitting of the registration request message for the candidate network slice of the second SIM comprises:

switching a data connection from the first SIM to the second SIM based on the candidate network slice of the second SIM being available;

transmitting the registration request message to the second network operator associated with the second SIM; and receiving a registration accept message from the second network operator.

4. The method of claim 3, wherein the registration request message transmitted to the first network operator comprises single network slice selection assistance information (S-NSSAI) about the first candidate network slice of the first SIM.

5. The method of claim 1, wherein the registration request message transmitted to the second network operator comprises S-NSSAI about the candidate network slice of the second SIM same as S-NSSAI about the first candidate network slice of the first SIM.

6. The method of claim 1, wherein storing the slice mapping information in the network slice database comprises:

receiving, from the first network operator, information on a plurality of network slices supported by the first network operator and receiving, from the second network operator, information on a plurality of network slices supported by the second network operator;

determining the first candidate network slice and the second candidate network slice supported by the first network operator and the candidate network slice supported by the second network operator;

creating the slice mapping information based on priorities of the first candidate network slice, the second candidate network slice, and the candidate network slice; and storing the created slice mapping information in the network slice database.

7. The method of claim 1, further comprising:

updating that the first candidate network slice of the first SIM is unavailable in the network slice database based on the first candidate network slice of the first SIM being unavailable or upon receiving the registration response message from the first network operator associated with the first SIM.

8. The method of claim 1, wherein determining the candidate network slice of the second SIM comprises:

checking the slice mapping information stored in the network slice database to determine the candidate network slice of the second SIM of a plurality of SIMs based on the first candidate network slice of the first SIM being unavailable.

9. The method of claim 1, further comprising:

determining at least one critical candidate network slice based on received information on a plurality of network slices supported by the first network operator associated with the first SIM and information on a plurality of network slices supported by the second network operator associated with the second SIM;

prioritizing the at least one critical candidate network slice in the network slice database based on the at least one critical candidate network slice;

checking the network slice database whether the at least one critical candidate network slice of the first SIM is available based on the prioritization;

transmitting the registration request message to the first network operator based on the at least one critical candidate network slice of the first SIM being available;

transmitting the registration request message to the second network operator based on the at least one critical candidate network slice of the first SIM being unavailable.

10. A multi-universal subscriber identity module (MUSIM) user equipment (UE) configured to manage an alternate-network slice, wherein the MUSIM UE comprises: memory; and at least one processor coupled to the memory, wherein the at least one processor is configured to:

store slice mapping information in the network slice database, wherein the slice mapping information comprises a mapping relationship among a first candidate network slice of a first SIM, a second candidate network slice of the first SIM, and a candidate network slice of the second SIM, wherein the slice mapping information indicates that the candidate network slice of the second SIM has a higher priority than the second candidate network slice of the first SIM as the alternate-network slice;

transmit, to a first network operator associated with a first SIM, a registration request message for the first candidate network slice of the first SIM;

receive, from the first network operator, a registration response message rejecting the first candidate network slice in response to the registration request message;

determine the candidate network slice of the second SIM based on the stored slice mapping information in the network slice database in response to receiving the registration response message rejecting the first candidate network slice; and transmit, to a second network operator associated with the second SIM, a registration request message for the candidate network slice of the second SIM.

11. The MUSIM UE of claim 10, wherein the at least one processor is configured to:

switch a data connection from the first SIM to the second SIM based on the candidate network slice of the second SIM being available;

transmit the registration request message to the second network operator associated with the second SIM; and receive a registration accept message from the second network operator.

12. The MUSIM UE of claim 11, wherein the registration request message transmitted to the first network operator comprises single network slice selection assistance information (S-NSSAI) about the first candidate network slice of the first SIM.

13. The MUSIM UE of claim 10, wherein the registration request message transmitted to the second network operator comprises S-NSSAI about the candidate network slice of the second SIM same as S-NSSAI about the first candidate network slice of the first SIM.

14. The MUSIM UE of claim 10, wherein the at least one processor is configured to:

receive, from the first network operator, information on a plurality of network slices supported by the first network operator and receive, from the second network operator, information on a plurality of network slices supported by the second network operator;

determine the first candidate network slice and the second candidate network slice supported by the first network operator and the candidate network slice supported by the second network operator;

create the slice mapping information based on priorities of the first candidate network slice, the second candidate network slice, and the candidate network slice; and store the created slice mapping information in the network slice database.

15. The MUSIM UE of claim 10, wherein the at least one processor is configured to update that the first candidate network slice of the first SIM is unavailable in the network slice database based on the first candidate network slice of the first SIM being unavailable or upon receiving the registration response message from the first network operator associated with the first SIM.

16. The MUSIM UE of claim 10, wherein the at least one processor is configured to check the slice mapping information stored in the network slice database to determine the candidate network slice of the second SIM of a plurality of SIMs based on the first candidate network slice of the first SIM being unavailable.

17. The MUSIM UE of claim 10, wherein the at least one processor is configured to:

determine at least one critical candidate network slice based on received information on a plurality of network slices supported by the first network operator associated with the first SIM and information on a plurality of network slices supported by the second network operator associated with the second SIM;

prioritize the at least one critical candidate network slice in the network slice database based on the at least one critical candidate network slice;

check the network slice database to determine whether the at least one critical candidate network slice of the first SIM is available based on the prioritization;

transmit the registration request message to the first network operator based on the at least one critical candidate network slice of the first SIM being available;

transmit the registration request message to the second network operator based on the at least one critical candidate network slice of the first SIM being unavailable.

18. A non-transitory computer-readable storage medium storing one or more programs, wherein the one or more programs comprise instructions, wherein the instructions, when executed by at least one processor of a multi-universal subscriber identity module (MUSIM) user equipment (UE), cause the MUSIM UE to:

store slice mapping information in the network slice database, wherein the slice mapping information comprises a mapping relationship among a first candidate network slice of a first SIM, a second candidate network slice of the first SIM, and a candidate network slice of a second SIM, wherein the slice mapping information indicates that the candidate network slice of the second SIM has a higher priority than the second candidate network slice of the first SIM as the alternate-network slice:

transmit, to a first network operator associated with a first SIM, a registration request message for the first candidate network slice of the first SIM;

receive, from the first network operator, a registration response message rejecting the first candidate network slice in response to the registration request message;

determine the candidate network slice of the second SIM based on the stored slice mapping information in the network slice database based in response to receiving the registration response message rejecting the first candidate network slice; and transmit, to a second network operator associated with the second SIM, registration request message for the candidate network slice of the second SIM.

* * * * *